US007456755B2

(12) United States Patent
Blum et al.

(10) Patent No.: US 7,456,755 B2
(45) Date of Patent: *Nov. 25, 2008

(54) FLOOR MAT AND SYSTEM HAVING ELECTRONIC DISPLAY DEVICE CONNECTABLE TO A NETWORK

(75) Inventors: Ronald D. Blum, Roanoke, VA (US); Dwight P. Duston, Laguna Niguel, CA (US)

(73) Assignee: Intellimat, Inc., Roanoke, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/760,195

(22) Filed: Jun. 8, 2007

(65) Prior Publication Data

US 2007/0222633 A1 Sep. 27, 2007

Related U.S. Application Data

(63) Continuation of application No. 11/316,928, filed on Dec. 27, 2005, which is a continuation of application No. 10/454,631, filed on Jun. 5, 2003, now Pat. No. 7,009,523, which is a continuation-in-part of application No. 10/438,923, filed on May 16, 2003, now Pat. No. 6,982,649, which is a continuation-in-part of application No. 10/285,639, filed on Nov. 1, 2002, now Pat. No. 6,873,266, which is a continuation of application No. 10/137,357, filed on May 3, 2002, now Pat. No. 6,507,285, which is a continuation of application No. 09/767,846, filed on Jan. 24, 2001, now Pat. No. 6,417,778, which is a continuation of application No. 09/418,752, filed on Oct. 15, 1999, now abandoned, which is a continuation-in-part of application No. 09/304,051, filed on May 4, 1999, now Pat. No. 6,219,876.

(60) Provisional application No. 60/385,579, filed on Jun. 5, 2002.

(51) Int. Cl.
*G08B 5/00* (2006.01)
(52) U.S. Cl. .................. 340/815.4; 340/691.6; 345/1.1; 345/2.1
(58) Field of Classification Search ............. 340/815.4, 340/691.6, 533, 539.1; 345/1.1, 2.1, 156
See application file for complete search history.

(56) References Cited

U.S. PATENT DOCUMENTS 2,191,704 A 2/1940 Bennett (Continued)

FOREIGN PATENT DOCUMENTS

CA 2169111 8/1997

(Continued)

OTHER PUBLICATIONS

Patent Abstracts of Japan, vol. 2002 & JP 2002 062832 A (Nippon Signal Co Ltd), Feb. 28, 2002.

(Continued)

*Primary Examiner*—Thomas J Mullen, Jr.
(74) *Attorney, Agent, or Firm*—Alston & Bird LLP

(57) ABSTRACT

A floor mat and system having an electronic display device connectable to a network is disclosed. In one embodiment, the floor mat includes an electronic display device that is adapted to be connected to a network through a computer. The electronic display device may be connected to the computer via a wired connection or a wireless connection. Also, text on the electronic display device may be changed by an editor through a web page on the network.

20 Claims, 11 Drawing Sheets

U.S. PATENT DOCUMENTS

| | | |
|---|---|---|
| 2,254,830 A | 9/1941 | Schloss |
| 2,276,104 A | 3/1942 | Shaunessey |
| 2,282,672 A | 5/1942 | Nelson |
| 2,512,310 A | 6/1950 | Corson |
| 2,791,851 A | 5/1957 | Laskow et al. |
| 2,791,852 A | 5/1957 | Lasko L L. |
| 2,800,215 A | 7/1957 | Converse |
| 2,843,868 A | 7/1958 | Borgstrom |
| 2,919,456 A | 1/1960 | Spivey |
| 3,078,490 A | 2/1963 | Etcher |
| 3,083,393 A | 4/1963 | Nappi |
| 3,141,522 A | 7/1964 | Fitzpatrick |
| 3,183,116 A | 5/1965 | Schaar |
| 3,300,275 A | 1/1967 | Lorman |
| 3,400,421 A | 9/1968 | Nappi |
| 3,435,481 A | 4/1969 | Kessler |
| 3,501,797 A | 3/1970 | Nappi |
| 3,517,407 A | 6/1970 | Wyant |
| 3,578,738 A | 5/1971 | Hughes |
| 3,663,980 A | 5/1972 | Conklin |
| 3,665,543 A | 5/1972 | Nappi |
| 3,696,459 A | 10/1972 | Kucera et al. |
| 3,699,926 A | 10/1972 | Stockl |
| 3,717,897 A | 2/1973 | Amos |
| 3,785,102 A | 1/1974 | Amos |
| 3,856,320 A | 12/1974 | Blanchard |
| 3,886,620 A | 6/1975 | Miller |
| 3,906,578 A | 9/1975 | Huber |
| 3,909,996 A | 10/1975 | Ettlinger, Jr. |
| 3,916,401 A | 10/1975 | Freeman |
| 3,930,084 A | 12/1975 | Shields |
| 4,107,811 A | 8/1978 | Imsande |
| 4,126,854 A | 11/1978 | Sheridon |
| 4,139,149 A | 2/1979 | Crepeau et al. |
| 4,143,103 A | 3/1979 | Sheridon |
| 4,143,194 A | 3/1979 | Wihksne |
| 4,328,275 A | 5/1982 | Vargo |
| 4,353,944 A | 10/1982 | Tarui |
| 4,421,509 A | 12/1983 | Schneider et al. |
| 4,435,451 A | 3/1984 | Neubert |
| 4,439,474 A | 3/1984 | Sagel |
| 4,482,593 A | 11/1984 | Sagel et al. |
| 4,484,250 A | 11/1984 | Rzepecki et al. |
| 4,559,250 A | 12/1985 | Paige |
| 4,564,546 A | 1/1986 | Jones |
| 4,567,481 A | 1/1986 | Meier et al. |
| 4,576,244 A | 3/1986 | Zeigner et al. |
| 4,603,495 A | 8/1986 | Stevens |
| 4,609,580 A | 9/1986 | Rockett et al. |
| 4,614,679 A | 9/1986 | Farrington, Jr. et al. |
| 4,654,514 A | 3/1987 | Watson et al. |
| 4,660,828 A | 4/1987 | Weiss |
| 4,665,342 A | 5/1987 | Topp et al. |
| 4,707,895 A | 11/1987 | Lang |
| 4,720,789 A | 1/1988 | Hector et al. |
| 4,752,114 A | 6/1988 | French |
| 4,766,295 A | 8/1988 | Davis et al. |
| 4,773,492 A | 9/1988 | Ruzumna |
| 4,798,754 A | 1/1989 | Tomek |
| 4,822,669 A | 4/1989 | Roga |
| 4,831,242 A | 5/1989 | Englehardt et al. |
| 4,853,678 A | 8/1989 | Bishop, Jr. et al. |
| 4,876,969 A | 10/1989 | Infanti |
| 4,917,975 A | 4/1990 | De Guzman |
| 4,924,363 A | 5/1990 | Kornelson |
| 4,959,265 A | 9/1990 | Wood et al. |
| 4,974,857 A | 12/1990 | Beall et al. |
| 5,018,235 A | 5/1991 | Stamatiou et al. |
| 5,071,628 A | 12/1991 | Alazet |
| 5,111,196 A | 5/1992 | Hunt |
| 5,117,221 A | 5/1992 | Mishica, Jr. |
| 5,134,716 A | 7/1992 | Craig |
| 5,142,733 A | 9/1992 | Mogel et al. |
| 5,160,921 A | 11/1992 | Killinger |
| 5,161,041 A | 11/1992 | Abileah et al. |
| 5,168,423 A | 12/1992 | Ohgami et al. |
| 5,185,948 A | 2/1993 | Markson |
| 5,204,159 A | 4/1993 | Tan |
| 5,210,528 A | 5/1993 | Schulman et al. |
| 5,237,767 A | 8/1993 | Kringel et al. |
| 5,241,467 A | 8/1993 | Failing et al. |
| 5,263,269 A | 11/1993 | Tjarnlund |
| 5,268,816 A | 12/1993 | Abell, Jr. et al. |
| 5,293,660 A | 3/1994 | Park |
| 5,297,353 A | 3/1994 | Ghalayini |
| 5,305,197 A | 4/1994 | Axler et al. |
| 5,335,788 A | 8/1994 | Beasley et al. |
| 5,344,693 A | 9/1994 | Sanders |
| 5,348,845 A | 9/1994 | Morigaki et al. |
| 5,448,226 A | 9/1995 | Failing, Jr. et al. |
| 5,460,381 A | 10/1995 | Smith et al. |
| 5,461,748 A | 10/1995 | Koiduka |
| 5,483,049 A | 1/1996 | Schulze, Jr. |
| 5,500,267 A | 3/1996 | Canning |
| 5,504,475 A | 4/1996 | Houdou et al. |
| 5,534,917 A | 7/1996 | MacDougall |
| 5,537,312 A | 7/1996 | Sekiguchi et al. |
| 5,548,282 A | 8/1996 | Escritt et al. |
| 5,556,685 A | 9/1996 | Swicegood, Jr. |
| 5,561,446 A | 10/1996 | Montlick |
| 5,562,580 A | 10/1996 | Beasley |
| 5,571,626 A | 11/1996 | Cumming et al. |
| 5,575,294 A | 11/1996 | Perry et al. |
| 5,589,246 A | 12/1996 | Calhoun |
| 5,604,027 A | 2/1997 | Sheridon |
| 5,613,313 A | 3/1997 | Homan et al. |
| 5,620,003 A | 4/1997 | Sepponen |
| 5,630,068 A | 5/1997 | Vela et al. |
| 5,646,818 A | 7/1997 | Hahn |
| 5,650,794 A | 7/1997 | Walsh |
| 5,658,637 A | 8/1997 | Volz |
| 5,678,334 A | 10/1997 | Schoniger |
| 5,695,346 A | 12/1997 | Sekiguchi et al. |
| 5,696,982 A | 12/1997 | Tanigawa et al. |
| 5,703,564 A | 12/1997 | Begum et al. |
| 5,704,049 A | 12/1997 | Briechle |
| 5,715,622 A | 2/1998 | Giordano, Jr. |
| 5,723,204 A | 3/1998 | Stefik |
| 5,736,967 A | 4/1998 | Kayser et al. |
| 5,747,133 A | 5/1998 | Vinod et al. |
| 5,753,900 A | 5/1998 | Goodwin, III et al. |
| 5,775,993 A | 7/1998 | Fentz et al. |
| 5,790,371 A | 8/1998 | Latocha et al. |
| 5,796,376 A | 8/1998 | Banks |
| 5,805,117 A | 9/1998 | Mazurek et al. |
| 5,815,995 A | 10/1998 | Adam |
| 5,816,550 A | 10/1998 | Watanabe et al. |
| 5,826,874 A * | 10/1998 | Teitell et al. ................ 473/225 |
| 5,838,286 A | 11/1998 | Pfeiffer et al. |
| 5,839,976 A | 11/1998 | Darr |
| 5,848,830 A | 12/1998 | Castle et al. |
| 5,869,350 A | 2/1999 | Heeger et al. |
| 5,885,684 A | 3/1999 | Hefner et al. |
| 5,886,474 A | 3/1999 | Asai et al. |
| 5,913,727 A * | 6/1999 | Ahdoot ...................... 345/156 |
| 5,914,670 A | 6/1999 | Goodwin, III et al. |
| 5,914,698 A | 6/1999 | Nicholson et al. |
| 5,932,863 A | 8/1999 | Rathus et al. |
| 5,945,502 A | 8/1999 | Hsieh et al. |
| 5,954,592 A | 9/1999 | Laffer et al. |
| 5,966,696 A | 10/1999 | Giraud |
| 5,971,761 A | 10/1999 | Tillman, Sr. |
| 6,001,456 A | 12/1999 | Newland |
| 6,010,429 A * | 1/2000 | Prueitt .......................... 482/4 |

| | | | |
|---|---|---|---|
| 6,012,244 A | 1/2000 | Begum et al. | |
| 6,016,481 A | 1/2000 | Failing, Jr. et al. | |
| 6,038,465 A | 3/2000 | Melton, Jr. | |
| 6,046,682 A | 4/2000 | Zimmerman et al. | |
| 6,067,080 A | 5/2000 | Holtzman | |
| 6,069,596 A | 5/2000 | Marvin et al. | |
| 6,084,526 A | 7/2000 | Blotky et al. | |
| 6,089,453 A | 7/2000 | Kayser et al. | |
| 6,107,936 A | 8/2000 | Zimmerman | |
| 6,128,186 A | 10/2000 | Feierbach | |
| 6,150,996 A | 11/2000 | Nicholson et al. | |
| 6,175,432 B1 | 1/2001 | Wu et al. | |
| 6,179,710 B1 | 1/2001 | Sawyer et al. | |
| 6,215,411 B1 | 4/2001 | Gothard | |
| 6,219,876 B1 | 4/2001 | Blum | |
| 6,233,776 B1 | 5/2001 | Blum et al. | |
| 6,236,330 B1 | 5/2001 | Cohen | |
| 6,243,690 B1 | 6/2001 | Adamec et al. | |
| 6,247,650 B1 | 6/2001 | Vachette et al. | |
| 6,266,052 B1 | 7/2001 | Kayser et al. | |
| 6,269,342 B1 | 7/2001 | Brick et al. | |
| 6,307,573 B1 | 10/2001 | Barros | |
| 6,336,136 B1 | 1/2002 | Harris | |
| 6,353,291 B1 | 3/2002 | Borgogno et al. | |
| 6,378,925 B1 | 4/2002 | Greenlee | |
| 6,387,061 B1 | 5/2002 | Nitto | |
| 6,409,132 B2 | 6/2002 | Heisler et al. | |
| 6,414,650 B1 | 7/2002 | Nicholson et al. | |
| 6,417,778 B2 * | 7/2002 | Blum et al. | 340/815.4 |
| 6,445,373 B1 | 9/2002 | Yamamoto | |
| 6,456,343 B2 | 9/2002 | Kim et al. | |
| 6,484,939 B1 | 11/2002 | Blaeuer | |
| 6,507,285 B2 | 1/2003 | Blum et al. | |
| 6,538,215 B2 | 3/2003 | Montagnino et al. | |
| 6,550,673 B2 | 4/2003 | Massaro | |
| 6,552,663 B2 | 4/2003 | Swartzel et al. | |
| 6,588,131 B2 | 7/2003 | O'Connell, Jr. | |
| 6,609,975 B1 | 8/2003 | Sawyer | |
| 6,612,670 B2 | 9/2003 | Liu | |
| 6,615,526 B2 | 9/2003 | Pitcher et al. | |
| 6,616,284 B2 | 9/2003 | Yaniv et al. | |
| 6,617,530 B1 | 9/2003 | Lin | |
| 6,630,948 B1 | 10/2003 | Walker | |
| 6,638,167 B1 | 10/2003 | Sawyer et al. | |
| 6,639,578 B1 | 10/2003 | Comiskey et al. | |
| 6,641,139 B2 | 11/2003 | Lamberti et al. | |
| 6,646,545 B2 | 11/2003 | Bligh | |
| 6,753,830 B2 | 6/2004 | Gelbman | |
| 6,788,283 B1 | 9/2004 | Blotky et al. | |
| 6,791,575 B2 | 9/2004 | Abboud | |
| 6,873,266 B2 | 3/2005 | Blum et al. | |
| 6,906,705 B2 | 6/2005 | Matsuo et al. | |
| 6,914,540 B2 | 7/2005 | Gongolas | |
| 6,917,301 B2 * | 7/2005 | Blum et al. | 340/815.4 |
| 6,929,182 B2 | 8/2005 | Rathus et al. | |
| 6,940,418 B2 | 9/2005 | Blum et al. | |
| 6,943,773 B2 | 9/2005 | Wong et al. | |
| 6,946,310 B2 | 9/2005 | Koyama | |
| 6,963,035 B2 | 11/2005 | Honda et al. | |
| 6,982,649 B2 | 1/2006 | Blum et al. | |
| 7,009,523 B2 * | 3/2006 | Blum et al. | 340/815.4 |
| 7,023,420 B2 | 4/2006 | Comiskey et al. | |
| 7,071,894 B1 | 7/2006 | Thielemans et al. | |
| 7,080,028 B2 | 7/2006 | Goodwin, III et al. | |
| 7,109,881 B2 | 9/2006 | Blum et al. | |
| 7,109,967 B2 | 9/2006 | Hioki et al. | |
| 7,138,585 B2 | 11/2006 | Kohn et al. | |
| 7,145,469 B2 | 12/2006 | Kokonaski et al. | |
| 7,161,590 B2 | 1/2007 | Daniels | |
| 7,205,903 B2 | 4/2007 | Blum et al. | |
| 2001/0011399 A1 | 8/2001 | Blum et al. | |
| 2001/0045893 A1 | 11/2001 | Swartzel et al. | |
| 2002/0021060 A1 | 2/2002 | Liu-Yu-An | |
| 2002/0126110 A1 | 9/2002 | Bowron | |
| 2002/0139847 A1 | 10/2002 | Goodwin, III | |
| 2002/0162108 A1 | 10/2002 | Lin-Hendel | |
| 2002/0167500 A1 | 11/2002 | Gelbman | |
| 2002/0174009 A1 | 11/2002 | Myers et al. | |
| 2002/0184098 A1 | 12/2002 | Giraud et al. | |
| 2002/0186221 A1 | 12/2002 | Bell | |
| 2002/0005775 A1 | 1/2003 | Sonnendorfer et al. | |
| 2003/0001985 A1 | 1/2003 | Doe | |
| 2003/0013417 A1 | 1/2003 | Bum | |
| 2003/0045043 A1 | 3/2003 | Koyama | |
| 2003/0058214 A1 | 3/2003 | Abboud | |
| 2003/0063052 A1 | 4/2003 | Rebh | |
| 2003/0066073 A1 | 4/2003 | Rebh | |
| 2003/0132924 A1 | 7/2003 | Hamilton | |
| 2003/0147694 A1 | 8/2003 | Ryman et al. | |
| 2003/0177679 A1 | 9/2003 | Blum | |
| 2003/0233659 A1 | 12/2003 | Guerin | |
| 2004/0001002 A1 | 1/2004 | Blum | |
| 2004/0001159 A1 | 1/2004 | Shen et al. | |
| 2004/0004827 A1 | 1/2004 | Guest | |
| 2004/0041800 A1 | 3/2004 | Daniels | |
| 2004/0051644 A1 | 3/2004 | Tamayama et al. | |
| 2004/0067777 A1 | 4/2004 | Salmon | |
| 2004/0109094 A1 | 6/2004 | Lindsay et al. | |
| 2004/0119602 A1 | 6/2004 | Blum | |
| 2004/0163574 A1 | 8/2004 | Schoenbach | |
| 2004/0165015 A1 | 8/2004 | Blum | |
| 2004/0217876 A1 | 11/2004 | Blum | |
| 2004/0217952 A1 | 11/2004 | Koyama | |
| 2004/0224777 A1 | 11/2004 | Smith et al. | |
| 2004/0239658 A1 | 12/2004 | Koyama | |
| 2005/0057893 A1 | 3/2005 | Homer et al. | |
| 2005/0085273 A1 | 4/2005 | Khalid | |
| 2005/0105252 A1 | 5/2005 | Tanaka | |
| 2005/0134474 A1 | 6/2005 | Kokonaski et al. | |
| 2005/0176509 A1 | 8/2005 | Hirato | |
| 2005/0195559 A1 | 9/2005 | Lu | |
| 2005/0219240 A1 | 10/2005 | Vesely | |
| 2005/0219694 A1 | 10/2005 | Vesely | |
| 2005/0219695 A1 | 10/2005 | Vesely | |
| 2005/0231008 A1 | 10/2005 | Jaaska, Sr. | |
| 2005/0248566 A1 | 11/2005 | Vesely | |
| 2005/0259094 A1 | 11/2005 | Liu et al. | |
| 2006/0044149 A1 | 3/2006 | Blum et al. | |
| 2006/0049955 A1 | 3/2006 | Blum | |
| 2006/0055633 A1 | 3/2006 | Koyama | |
| 2006/0082536 A1 | 4/2006 | Koyama | |
| 2006/0092150 A1 | 5/2006 | Blum | |
| 2006/0188406 A1 | 8/2006 | Forst, III | |
| 2006/0192683 A1 | 8/2006 | Blum | |
| 2006/0221071 A1 | 10/2006 | Vesely | |
| 2006/0227085 A1 | 10/2006 | Boldt et al. | |
| 2006/0227427 A1 | 10/2006 | Dolgoff | |
| 2006/0250390 A1 | 11/2006 | Vesely | |
| 2006/0262188 A1 | 11/2006 | Elyada et al. | |
| 2007/0000849 A1 | 1/2007 | Lutz et al. | |

FOREIGN PATENT DOCUMENTS

| | | |
|---|---|---|
| CA | 2176330 | 11/1997 |
| DE | 31 46 113 A1 | 6/1982 |
| DE | 31 47 113 A1 | 6/1983 |
| DE | G 87 01 817.9 | 4/1987 |
| DE | 39 23 959 C1 | 10/1990 |
| DE | 39 15 254 A1 | 11/1990 |
| DE | 40 06 781 A1 | 9/1991 |
| DE | 41 35 877 A1 | 5/1993 |
| DE | 4242258 A1 | 4/1994 |
| DE | 298 15 011 U1 | 12/1998 |
| EP | 0 009 891 A1 | 4/1980 |
| EP | 0 188 005 A2 | 7/1986 |
| EP | 0 199 537 A2 | 10/1986 |

| | | | |
|---|---|---|---|
| EP | 0 202 846 A1 | 11/1986 |
| EP | 0 353 139 A2 | 1/1990 |
| EP | 0 354 281 A1 | 2/1990 |
| EP | 0 359 478 A2 | 3/1990 |
| EP | 0 365 869 A1 | 5/1990 |
| EP | 0 374 860 A2 | 6/1990 |
| EP | 0 421 258 A1 | 4/1991 |
| EP | 0 448 768 A1 | 9/1991 |
| EP | 0 512 904 A2 | 11/1992 |
| EP | 0 514 191 A1 | 11/1992 |
| EP | 0 554 641 A1 | 8/1993 |
| EP | 0 573 277 A1 | 12/1993 |
| EP | 0 624 681 A2 | 11/1994 |
| EP | 0 648 834 A1 | 4/1995 |
| EP | 0 721 176 A2 | 7/1996 |
| EP | 0 751 213 A1 | 1/1997 |
| EP | 0 794 244 A1 | 9/1997 |
| EP | 0 839 900 A1 | 5/1998 |
| EP | 0 895 745 A1 | 2/1999 |
| EP | 0 624 125 B1 | 6/1999 |
| EP | 0 971 064 A2 | 1/2000 |
| EP | 1 008 927 | 6/2000 |
| EP | 1308120 A2 | 5/2003 |
| EP | 1562159 A1 | 8/2005 |
| EP | 1580708 A1 | 9/2005 |
| FR | 2 532 095 A1 | 2/1984 |
| GB | 319416 | 9/1929 |
| GB | 433133 | 8/1935 |
| GB | 102508 | 8/1965 |
| GB | 2 182 242 A | 5/1987 |
| GB | 2 263 003 A | 7/1993 |
| GB | 2386833 A | 10/2003 |
| GB | 04111142.3 | 5/2004 |
| GB | 0411142.3 | 6/2004 |
| GB | 2425968 A | 11/2006 |
| GR | 950100458 | 2/1997 |
| JP | 61180358 A | 8/1986 |
| JP | 04-144532 | 5/1992 |
| JP | 05181437 A | 7/1993 |
| JP | 06-189890 | 7/1994 |
| JP | 6242737 A | 9/1994 |
| JP | 06-299682 | 10/1994 |
| JP | 07008438 A | 1/1995 |
| JP | 07-036395 | 2/1995 |
| JP | 07-295739 | 11/1995 |
| JP | 8-056810 | 3/1996 |
| JP | 08-239988 | 9/1996 |
| JP | 09006249 | 1/1997 |
| JP | 09-006249 | 10/1997 |
| JP | 10-057728 | 3/1998 |
| JP | 11-056743 | 3/1999 |
| JP | 11-109901 | 4/1999 |
| JP | 2000-039861 | 2/2000 |
| JP | 2000-105558 | 4/2000 |
| JP | 3072047 | 7/2000 |
| JP | 2003099155 | 4/2003 |
| JP | 2003-203502 | 7/2003 |
| JP | 2004-099198 | 4/2004 |
| JP | 04351679 A | 12/2004 |
| TW | 0241845 B | 10/2005 |
| WO | WO 1991/08701 | 6/1991 |
| WO | WO 1992/09061 | 5/1992 |
| WO | WO 1993/20536 | 10/1993 |
| WO | WO 95/05631 | 2/1995 |
| WO | WO 9910057 A1 | 3/1999 |
| WO | WO 9942186 A1 | 8/1999 |
| WO | WO 2000/07811 | 2/2000 |
| WO | WO 2000/16682 | 3/2000 |
| WO | WO 2000/29209 | 5/2000 |
| WO | WO 00/57393 | 9/2000 |
| WO | WO 2001/016995 | 3/2001 |
| WO | WO 2001/27909 A1 | 4/2001 |
| WO | WO 2001/77746 A1 | 10/2001 |
| WO | WO 2002/11110 A1 | 2/2002 |
| WO | WO 2002/22972 A1 | 3/2002 |
| WO | WO 2002/065451 A1 | 8/2002 |
| WO | WO 2002/100094 A3 | 12/2002 |
| WO | WO 03003729 A1 | 1/2003 |
| WO | WO 2000/19871 | 4/2003 |
| WO | WO 03075238 A1 | 9/2003 |
| WO | WO 03098345 A1 | 11/2003 |
| WO | WO 03103470 A1 | 12/2003 |
| WO | WO 04036292 A2 | 4/2004 |
| WO | WO 04049285 A1 | 6/2004 |
| WO | WO 04068452 A2 | 8/2004 |
| WO | WO 04075147 A1 | 9/2004 |
| WO | WO 05057527 A2 | 6/2005 |
| WO | WO 05072282 A2 | 8/2005 |
| WO | WO 2005/114623 A1 | 12/2005 |
| WO | WO 06020637 A1 | 2/2006 |
| WO | WO 06034483 A1 | 3/2006 |

OTHER PUBLICATIONS

"Floor Graphics" Advertisements, date unknown.

"Displaying a Winning Glow", Michael Kenward, Technology Review, Jan./Feb. 1999, vol. 102, No. 1, 7pages.

Alpha 215 Series display brochure, "http://www.adaptivedisplays.com", date unknown.

U.K. Patent Office Search Report dated May 23, 2003 (cited in U.S. Appl. No. 10/759,167 filed Jan. 20, 2004).

"Screen Saviors", Michael Mattis, Business 2.0 Jul. 1999, 1 page (cited in U.S. Appl. No. 11/616,928 filed Dec. 27, 2005).

"What's New", "Intelligent Ink", Advertising Material, Popular, 1 page, no date (cited in U.S. Appl. No. 11/316,928 filed Dec. 27, 2005).

"Electronic Ink", Glen Sanders, ebooknet.com, 2 pages, Sep. 20, 1999 (cited in U.S. Appl. No. 11/316,928 filed Dec. 27, 2005).

MMR Journal, "Floor Decals New Wrinkle in P-O-P Ads", vol. 16, No. 10, p. 13, Apr. 5, 1999 USA (cited in U.S. Appl. No. 11/316,928 filed Dec. 27, 2005).

Philadelphia Enquirer, "Cherry Hill, N.J. Firm Wants You to Look Down on Its Ads", Regional Newspaper, Aug. 27, 1998 USA (cited in U.S. Appl. No. 11/316,928 filed Dec. 27, 2005).

Flexible, Collaborative Organization On A Tabletop; ACM CSCW 2002: Workshop on Co-located Tabletop Collabaration: Technologies and Directions, New Orleans, Louisiana US; Nov. 2002; available at; http://hci.stanford.edu/publications/2002/table_organization/table_organization.pdf on Oct. 4, 2007.

What is Flasma? ©2003; available at http://flasma.com/site8f63.html?pg=1 on Oct. 4, 2007.

Lumisight Table; Interactive View-Dependent Display - Table Surrounded by Multiple Users; ©2004; available at http://www.hc.ic.i.u-tokyo.ac.jp/project/Lumisight/ on Oct. 4, 2007.

Intellimat: what works in digital signage is right at your feet! ©2006; available at http://intellimat.com/index.htm on Oct. 4, 2007.

Sharing and Browsing Media on a Digital Tabletop; 2006; http://alumni.media.mit.edu/~matt/cv/tviews_carpe_03.pdf.

Northrup Grumman; Defining the Future; TouchTable™; ©2007; located at http://www.ms.northropgrumman.com/touchtable/.

Lightspaceplay; Ultimate Interactive Play System; Product Brochure; 2006; http://www.lightspacecorp.com/products/downloads/LightspacePlay.pdf.

Reactrix; Northing Works Like Barnd Play; ©2007; available at http://www.reactrix.com/index.php on Oct. 4, 2007.

* cited by examiner

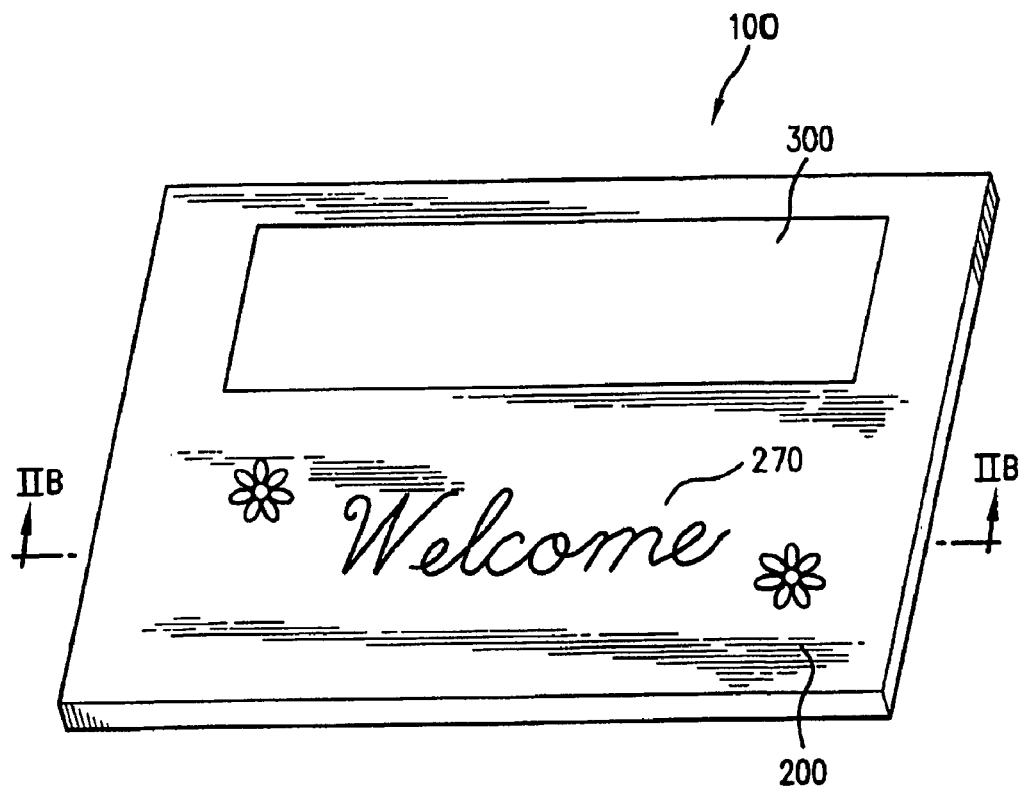
IIB - IIB
FIG. 2B

FLOOR MAT AND SYSTEM HAVING ELECTRONIC DISPLAY DEVICE CONNECTABLE TO A NETWORK

CROSS-REFERENCE TO RELATED APPLICATIONS

This application is a continuation of U.S. application Ser. No. 11/316,928, filed Dec. 27, 2005, which is a continuation of U.S. application Ser. No. 10/454,631, filed Jun. 5, 2003, and issued as U.S. Pat. No. 7,009,523 on Mar. 7, 2006. U.S. application Ser. No. 10/454,631 claims the benefit under 35 U.S.C. § 119(e) of U.S. provisional application 60/385,579 filed Jun. 5, 2002. Further, U.S. application Ser. No. 10/454,631 is a continuation-in-part of application Ser. No. 10/438,923, filed May 16, 2003, and issued as U.S. Pat. No. 6,982,649 on Jan. 3, 2006, application Ser. No. 10/438,923 is a continuation-in-part of application Ser. No. 10/285,639, filed Nov. 1, 2002, and issued as U.S. Pat. No. 6,873,266 on Mar. 29, 2005. Application Ser. No. 10/285,639 is a continuation of application Ser. No. 10/137,357, filed May 3, 2002, and issued as U.S. Pat. No. 6,507,285 on Jan. 14, 2003. Application Ser. No. 10/137,357 is a continuation of application Ser. No. 09/767,846, filed Jan. 24, 2001, and issued as U.S. Pat. No. 6,417,778 on Jul. 9, 2002. Application Ser. No. 09/767,846 is a continuation of application Ser. No. 09/418,752, filed Oct. 15, 1999, and now abandoned. Application Ser. No. 09/418,752 is a continuation-in-part of application Ser. No. 09/304,051, filed May 4, 1999, and issued as U.S. Pat. No. 6,219,876 on Apr. 24, 2001. All of the above-identified applications are incorporated herein in their entirety by reference.

BACKGROUND AND DISCUSSION OF THE INVENTION

The present invention relates to a floor mat. More specifically, the invention provides a floor mat that includes a cleanable portion. The floor mat may also include a water dissipation component, a water absorbing component, a cushioning component, customized graphics, a transparent cleanable portion, a tacky surface on the cleanable portion, an antibacterial composition, an antifungal composition, and a fragrance. Additionally, the cleanable portion may be erodible and may include a plurality of cleanable reusable layers.

Floor mats are known for cleaning the soles of a person's shoes who is about to enter a particular area or room. One problem with floor mats in general is how to keep the floor mat sufficiently clean such that it may perform its function of cleaning the person's shoes when, by its very nature, it is purposefully dirtied when performing its function.

Known floor mats may be comprised of a single, unitary piece of material. Whereas these single structure floor mats may be kept clean by, for example, washing the floor mat, it may be required that the entire floor mat be removed from its location for washing and thus, the floor mat is not available where desired while the entire mat is being cleaned. Alternatively, even if the mat can be cleaned in-place, which may not be a possibility if it is located in, for example, a carpeted area, it may be inconvenient to clean the mat in-place.

U.S. Pat. No. 3,785,102 to Amos discloses a throw-away pad comprising a plurality of stacked disposable sheets where, when a particular sheet is dirtied, the dirty sheet is removed and disposed of. The next sheet that is exposed after the dirty sheet is discarded is clean and thus, a clean surface is again available. However, there may be problems with comprising the floor mat of disposable sheets. Disposing of each dirty sheet may be uneconomical since each sheet is discarded after it becomes dirty. Additionally, after some finite number of sheets are disposed of, no sheets will remain and thus no effective cleaning surface is available.

U.S. Pat. No. 3,785,102 to Amos also discloses that an adhesive can be provided on each sheet's top surface to improve its ability to remove dirt from a person's shoes. However, again, these sheets are not cleanable and therefore are not reusable. U.S. Pat. No. 3,717,897 to Amos et al. discloses a pad for cleaning shoes and wheels. The pad includes a thin water-washable adhesive covering its upper surface for removing dirt from shoes and wheels. Whereas the '897 patent discloses a pad with a water-washable adhesive upper surface, the pad is not known for use domestic or office-type applications. As stated in the '897 patent, the pad is placed at an entrance doorway leading into a clean room.

Tacky floor mats are by far more popular for utilization in indoor environments that are far removed from exterior outside entrances, such as for clean rooms that are well-within the interior of the building in which they are used, e.g., hospital rooms, computer chip manufacturing spaces, and gymnasiums. Thus, tacky floor mats are not known for use in areas that are adjacent to entrances that lead from the outdoor environment for cleaning the soles of a person's shoes prior to entry into the interior of a building, such as for example in an entry foyer or on an outdoor porch.

Tacky floor mats are not known for use in domestic or office-type applications, e.g., home or business office use, because of several known deficiencies. One of these deficiencies is that their tacky surface will not be as effective if it becomes wet.

Therefore, if the tacky surface floor mat was utilized in an outdoor environment, such as the outdoor porch mentioned above, or in an indoor environment that is adjacent to or near an outdoor entrance, such as an entry foyer of a home or business, for cleaning a person's shoes prior to further entering the home or business, the mat is likely to become wet and therefore not effective. The mat could become wet from, for example, the moisture in the atmosphere or from moisture carried on the soles of the person's shoes who steps on the mat. Additionally, if the tacky surface becomes wet it may become slippery and thus cause a hazard for the person who steps on it.

Additional deficiencies with using known tacky floor mats for home or office-type applications as discussed above is their likelihood of becoming trip hazards and their lack of aesthetic appeal. In the '897 patent, because the pad is designed for use in clean room environments, it is adhesively adhered to the passageway floor in front of the entrance doorway. This may be satisfactory for retaining the mat in-place in clean room-type of applications, however, if it was attempted to use the '897 pad on a carpeted floor, the pad would not properly adhere to the carpet and thus a trip hazard would be present. This could result in significant liability issues. The '897 pad does not have sufficient mass for it to remain in-place without utilizing an adhesive. Regarding aesthetics, because tacky floor mats are known only for their functional characteristics, and thus for use only in "clean room"-type applications, they are not aesthetically pleasing. Therefore, for at least the above reasons, tacky floor mats are not known for use in home or office-type applications.

Additional drawbacks with known floor mats exist that are directed to issues of customization for a particular purchaser and a lack of additional cleaning properties. A floor mat may be the first object that a visitor to a particular home or business encounters. As such, the owner of the home or business may want to utilize the floor mat to graphically convey an initial greeting or message to the visitor. Whereas floor mats are known that may include a greeting on them, it is not currently known to allow for a particular purchaser to customize the displayed graphic so that the message is tailored to convey a particular message desired by the purchaser. For example, on Halloween the purchaser may want the floor mat to display a "Happy Halloween" message. In another situation, the purchaser may want to greet a particular visitor with a message such as "Hello, Joe". Currently, it is not known to provide a floor mat where an individual can customize the floor mat to display a particular message that they want to convey and in certain circumstances even change the floor mat's message they want to convey.

An additional problem with known floor mats, as mentioned above, is that they are limited in their ability to clean the soles of a person's shoes. Whereas known floor mats may be capable of removing dirt particles from the shoe's soles, they are not able to disinfect the soles nor provide a scent to the soles to assist in masking any unpleasant odors that may be associated with the shoes.

Therefore, it would be desirable to provide an advanced floor mat that could address deficiencies that exist with currently known floor mats. The advanced floor mat of the present invention overcomes deficiencies in the prior art and may include a base portion which incorporates a cleanable portion that is adapted to be removably received within the floor mat. The floor mat may also include features such as a water dissipation capability, a water absorbing capability, a cushioning capability, customized graphics, a transparent portion, a tacky surface on the cleanable portion, an antibacterial composition, an antifungal composition, and a fragrance. Additionally, the cleanable portion may include the features of being erodible and containing a plurality of cleanable reusable layers. Other features will be apparent from the detailed description which follows.

BRIEF DESCRIPTION OF THE DRAWINGS

The various features of the invention will best be appreciated by simultaneous reference to the description which follows and the accompanying drawings, in which:

FIG. 2B shows a cross-sectional view of a layer comprising electronic components according to an alternative embodiment of the invention;

DETAILED DESCRIPTION

Figure 1:
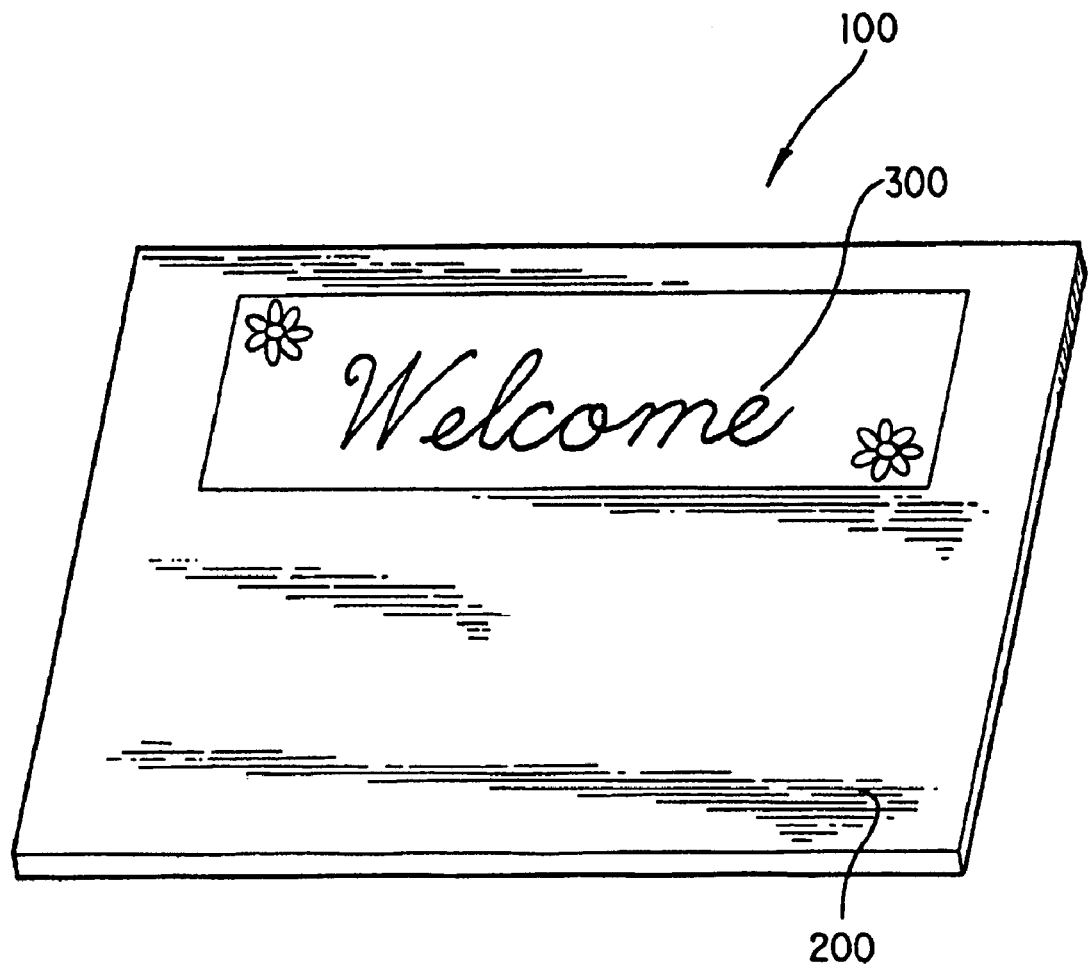
FIG. 1 is a perspective view of a floor mat in accordance with an embodiment of the present invention.

FIG. 1 illustrates a first embodiment for a floor mat 100 in accordance with the principles of the present invention. As can be seen in FIG. 1, floor mat 100 includes a base portion 200 and a cleanable insert portion 300. As will be further described later in this specification, in this embodiment, cleanable portion 300 is received within base portion 200 and is removable from base portion 200.

Figure 2:
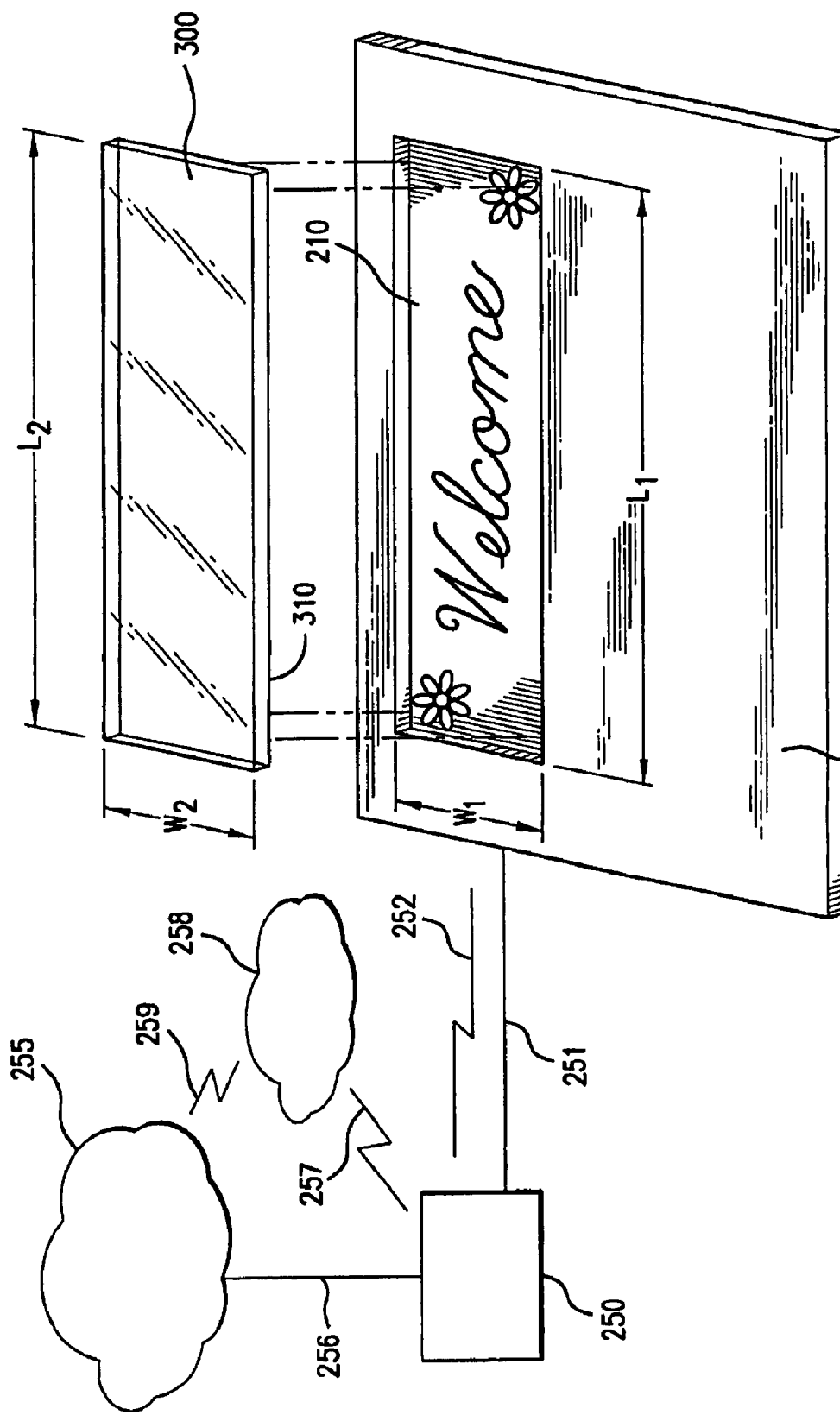
FIG. 2 is an exploded perspective view of the floor mat of FIG. 1.

FIG. 2 illustrates an exploded, perspective view of the floor mat of FIG. 1. As can be seen in FIG. 2, base portion 200 is formed as a generally flat, planar member and defines a recess 210 within the top surface of base portion 200. Base portion 200 provides sufficient weight and mass for supporting cleanable insert portion 300 and maintaining the floor mat's positioning on the surface on which it is placed. Base portion 200 may include, as will be discussed below, a water dissipation capability, a water absorption capability, and a cushioning capability and may be comprised of materials such as polyurethane, polyisoprene and other cross-linked elastomeric materials, such as nylon-6, molded or woven to form a porous structure.

Recess 210 can be configured in any of a variety of geometric configurations, however, in the present embodiment, recess 210 is configured in a rectangular shape. Recess 210 has a length $L_1$ and a width $W_1$. The depth of recess 210 is such that it is able to receive within it cleanable insert portion 300 such that when cleanable insert portion 300 is received within recess 210, the top surface of cleanable insert portion 300 lies generally in the same plane as the top surface of base portion 200.

The top surface of base portion 200 may be colored with any color depending upon the desires of a particular purchaser, however, it is preferable that a color be utilized that will minimize the visibility of any dirt that is accumulated by base portion 200. For example, it may be desirable that darker colors be utilized for the top surface of base-portion 200 rather than lighter colors. However, again, any particular color may be utilized for base portion 200, and particularly the top surface of base portion 200, depending upon the particular desires of an individual.

As can be seen in FIG. 2, the surface of base portion 200 which defines the bottom of recess 210 may include graphics 220 on that surface. In the illustrated embodiment, the graphics include pictorial representations of flowers and a text message which spells out the word "WELCOME". The present invention is not limited to any particular graphic within recess 210 and the present invention may include any of a variety of different forms of graphics.

Graphics 220 may be modified, and thus customized, by an individual after the floor mat has been purchased by the owner. The owner may customize the mat at their home or office and, thus, a graphic that may be appropriate for a particular situation may be modified by the individual for display in another situation. For example, the graphic may display a message stating "Happy Halloween" for Halloween and may be modified to display "Happy Holidays" during the winter holiday season. Thus, as can be understood, the graphics are modifiable by a user and thus, may be customized for the particular desires of a particular user.

As stated above, the present invention is not limited to any particular form for graphics 220. The graphics 220 can be customized by a user to include any of a variety of different colors, pictures, messages, or other representations that the user may want to display. In addition, the visible intensity of a color(s) can be modified. For example, a color that glows at night could be included in graphics 220 for an occasion such as Halloween.

Any of a variety of different types of structures or methods may be practiced in the present invention for modifying graphics 220 of floor mat 100 and the present invention is not limited to any particular methodology or structure for modifying graphics 220. Additionally, all of the various embodiments contemplated for providing a modifiable graphic display in the floor mat of the present invention can be incorporated in either, or both, of the base portion or the insert portion. For example, the graphics may consist of pre-formed messages or art forms which may be adhered to either the surface which defines the bottom of recess 210, such as by using an adhesive or fastener assembly, e.g., a hook and loop assembly, or to the underside of insert portion 300 such that, when insert portion 300 is placed within base portion 200, the graphics would be visible through a transparent insert portion.

Alternatively, a variety of different graphics may be stored within floor mat 100 such that a user is able to selectively uncover a particular graphic for display while the other available graphics remain covered within floor mat 100. This type of selectability is known in other mediums where selectivity between a variety of different graphics within a common display panel is desired. For example, advertising bulletin boards at sporting events are able to selectively display a first particular message during a first particular period of time and display a second message during a second period of time on the same bulletin board.

A third possible alternative is to provide a modifiable display surface on the floor mat. The display surface can be associated with either the base portion or the insert portion, e.g., on either the bottom surface of recess 210 or a panel attached to the bottom of insert portion 300. A display could be included on the front of the floor mat, on the back of the mat such that it is viewable through a transparent portion of the mat, embedded in the mat, attached to the mat, or integrally formed in the mat. For example, the display could be comprised of a small, thin box of graphics that could attach to a tacky portion and/or a base portion or any other component part of the floor mat. However it is associated with the floor mat, a user may design and display their customized graphic and may subsequently modify that graphic such that it is replaced with another graphic. A display surface such as an erasable writing board could be utilized for this purpose.

It is also contemplated that a modifiable electronic display surface could be provided, such as, for example, a liquid crystal display panel. The display panel could be connected to a computer 250 and a computer generated image could be displayed on the display panel. The connection between the display panel and the computer 250 could be a wired connection 251 or a wireless connection as illustrated by electromagnetic wave 252. Thus, the image displayed on the display panel could be modified by generating a different computer image and displaying that computer image on the display panel. The display panel could be associated with base portion 200, such as included within recess 210, or could be included on a bottom surface, facing upward, of insert portion 300. Alternatively, the display panel could be integrally formed with either of the base portion or the insert portion. The modifiable display could utilize a plurality of different graphics that scroll across the display, either individually or in combination.

Other alternatives for modifying the graphics 220 of floor mat 100 include using light emitting polymers to create, and thus change, graphics 220. The light emitting polymers can be either applied to, attached to, or woven into the floor mat. The light emitting polymers may be utilized on any portion of floor mat 100, for example, on either the base portion or the insert portion, or on any other portion of the different embodiments for the floor mat. Light emitting polymers are known and described in U.S. Pat. Nos. 5,945,502, 5,869,350, and 5,571,626, which are incorporated herein by reference in their entirety.

Other options for a display panel are to use electronic ink or electric paper. Electric paper is available from Xerox and is described in U.S. Pat. Nos. 5,723,204, 5,604,027, 4,126,854, and 4,143,103, which are incorporated herein by reference in their entirety. Electric paper employs thousands of tiny, electrically charged beads, called Gyricon, each about the width of a human hair, to create pixels. The two-tone beads are embedded inside a liquid-filled plastic sheeting that forms the surface of the paper. Each bead, half-black, half-white, gyrates in response to an electric field. Whether the beads are black- or white-side up determines the image. Because there's no need to refresh the image, and because the screen isn't backlit, electric paper uses only a fraction of the power used by conventional electronic displays. Electromagnetic styluses and printer-like devices can be used for getting images onto the paper.

Electronic ink is available from E Ink Corp., at 45 Spinelli Pl., Cambridge, Mass. 02138. Electronic ink uses a microencapsulated micromechanical display system. Tiny microcapsules are captured between two sheets of plastic to create pixels. Alternatively, the capsules may be sprayed on a surface. The result is a flexible display material. The tiny capsules are transparent and contain a mixture of dark ink and white paint chips. An electric charge is passed through the capsules. Depending on the electrostatic charge, the paint chips float at the top or rest on the bottom of each capsule. When the paint chips float at the top, the surface appears white. When they rest at the bottom, and thus under the ink, the surface appears black. Each of the two states is stable: black or white. A transparent electromagnetic grid laid over the sheet's surface controls the shape of the image. The display may be wirelessly connected to, for example, a computer 250 and thus, to a network 255 such as the World Wide Web by utilizing, for example, a Motorola paging system 258. The connection between the network 255 and computer 250 could be a wired connection 256 or a wireless connection as illustrated by electromagnetic wave 257 from computer 250 to paging system 258 and electromagnetic wave 259 from paging system 258 to network 255. Text on all displays, if multiple displays are used, can be changed at once by a single editor, through a Web page.

Again, a display panel, which could utilize any of the methods discussed above for modifying the display panel, could be associated with any portion of the floor mat, such as base portion 200 within recess 210 or on a bottom surface, facing upward, of insert portion 300. Alternatively, the display panel could be integrally formed with either of the base portion or the insert portion.

Figure 2A:
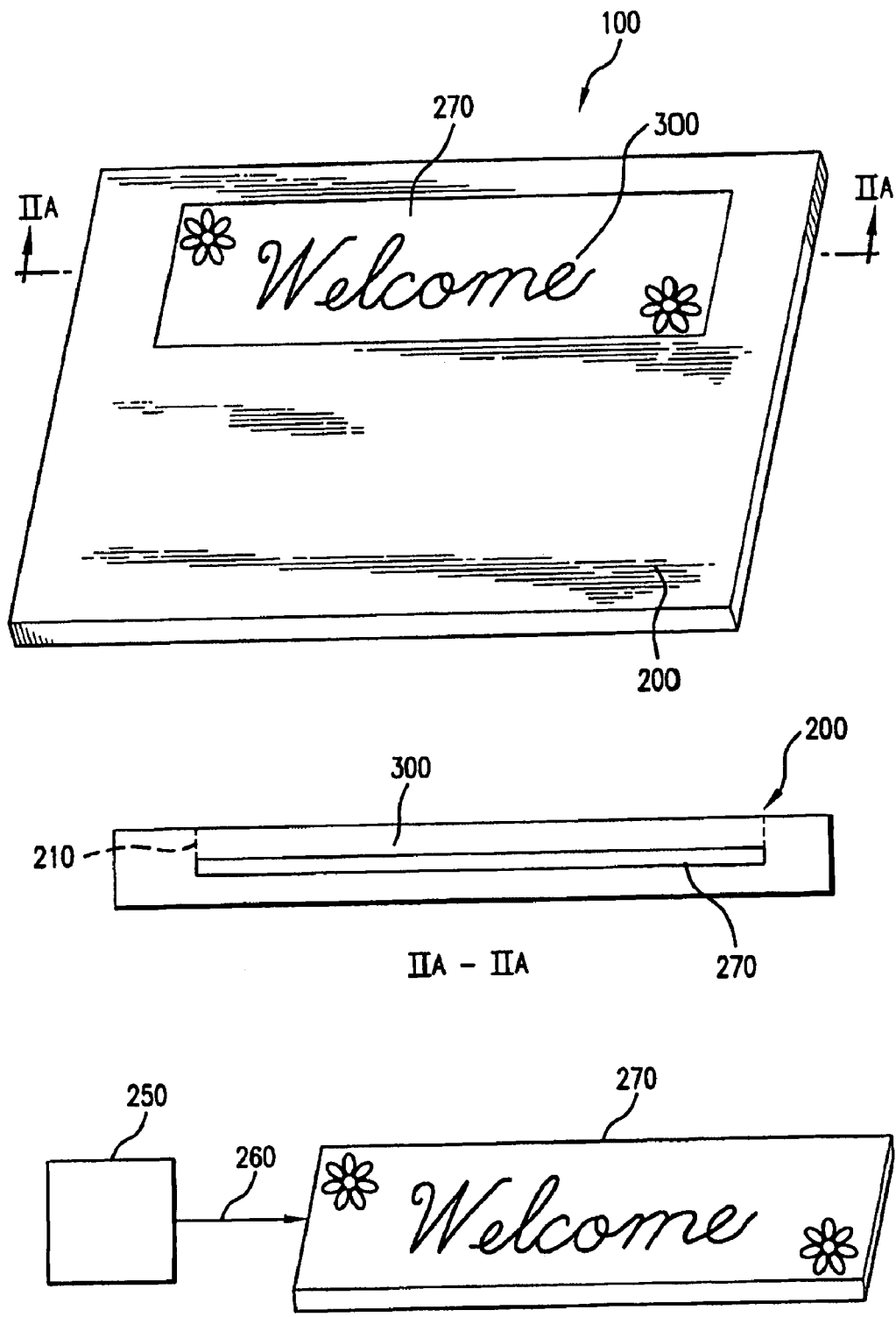
FIG. 2A shows a cross-sectional view of a layer comprising electronic components according to embodiments of the invention, and a computer for controlling a modifiable electronic display of the layer.

FIG. 2A illustrates one possible embodiment of a layer comprising electronic components as described above. In particular, cross-sectional view IIA-IIA shows a layer 270 which could comprise electronic components such as a display panel containing a liquid crystal display, light-emitting polymers, electric paper or electronic ink for providing a modifiable electronic display. Alternatively, the layer 270 could comprise light-emitting polymers applied to, attached to, or woven into the floor mat as described. The layer 270 may be disposed within a recess 210 of base portion 200, under an insert portion 300. A computer 250 may generate signals 260, propagated via a wired connection 251 or wireless connection 252 as described above, for controlling the layer 270 to produce a desired display.

FIG. 2B illustrates another possible embodiment of a layer comprising electronic components as described above. In particular, cross-sectional view IIB-IIB shows a layer 270 comprising electronic components and being formed on a surface of base portion 200, as opposed to being located within a recess or under an insert portion. Areas 275 of layer 270 represent, for example, light-emitting polymers woven into the base portion surface and activated to spell out the word "Welcome."

In further describing base portion 200, as mentioned above, base portion 200 may also include both a water dissipation component and a cushioning component. The water dissipation component provides for transferring moisture from the soles of a person's shoes that is standing on floor mat 100 to reduce the degree of moisture transferred to cleanable insert portion 300 and the cushioning component provides for conforming the floor mat 100 to the shape of the person's soles such that a greater amount of the debris on the person's soles may be removed by floor mat 100. The present invention is not limited to any particular structure or material for the water dissipation component and the cushioning component. For example, the water dissipation component may be comprised of any of a wide variety of known materials, such as polyamides, vinylics, and polyisoprene. It is desirable, but not required, that the water dissipation component dissipate or move the water and not retain the water. Thus, porous materials, and not hydrophilic materials, are desired. The cushioning component may be comprised of any of a variety of cushioning components to include, for example, foam rubber.

FIG. 2 also further illustrates cleanable insert portion 300. As can be seen, cleanable insert portion 300 has a geometric shape which is complementary in size and form to the recess 210 that is formed within base portion 200. As such, cleanable insert portion 300 is able to be received securely within recess 210. Thus, cleanable insert portion 300 has a length $L_2$ which is just slightly smaller than the length $L_1$ of recess 210. Likewise, cleanable insert portion 300 has a width $W_2$ which is also just slightly smaller than width $W_1$ of recess 210.

On the bottom side 310 of cleanable insert portion 300, i.e., that surface which contacts the surface which defines the bottom of recess 210, an attachment mechanism may be provided such that cleanable insert portion 300 may be removably attached to base portion 200 within recess 210. Any of a variety of different attachment mechanisms may be provided on the bottom surface of cleanable insert portion 300 to include, for example, a hook and loop fastener assembly or an adhesive. Regardless of the particular securement mechanism used to removably attach cleanable insert portion 300 to base portion 200, in this embodiment, cleanable insert portion 300 may be removed from base portion 200 such that it may be cleaned by a user and, after cleaning, be reinserted within recess 210 such that a clean surface is now provided for floor mat 100.

As stated above, cleanable insert portion 300 may be formed from a transparent material such as hydrophilic aliphatic acrylic polymers and copolymers incorporating acrylic acid, hydroxy ethyl methacrylate, and glycerin monomethacrylate. Forming cleanable insert portion 300 of a transparent material would allow an individual to view the customized graphics that may be provided within floor mat 100, as discussed previously. Additionally, the top side of cleanable insert portion 300 may include a tacky surface. The tacky surface would provide for assisting in removing debris from the soles of a person's shoes that is standing on cleanable insert portion 300. When the top tacky surface of cleanable insert portion 300 is dirtied to such an extent that the user desires to clean insert portion 300, in this embodiment, the user removes insert portion 300 from base portion 200 and cleans insert portion 300 to remove the accumulated debris. The insert portion 300 is then reinserted into base portion 200.

The tacky surface that is provided on the top side of cleanable insert portion 300 could be comprised of any of a variety of materials, such as polyvinyl chlorides combined with a suitable plasticizer, plasticized neoprene, polysulfides, and polyurethanes. Additionally, acrylics, such as butyl acrylate and many of its homologues, may be utilized. Again, the present invention is not limited to any particular material. The only consideration, in this embodiment, is that the surface should maintain its tacky characteristic even after repeated cleaning cycles.

The present invention is not limited to-any-particular methodology for cleaning insert portion 300. Insert portion 300 may be cleaned by any of a variety of methods depending upon a particular material composition for insert portion 300. For example, insert portion 300 may be cleaned by placing insert portion within a washing machine and washing insert portion 300 or insert portion 300 may be cleaned by scrubbing insert portion 300 with a scrub brush and soap and water or with a cleaning agent such as "Spic 'N Span".

Additionally, the insert portion 300 could be cleaned by utilizing a roller that also includes a tacky surface around the circumference of the roller. The tacky surface of the roller is comprised of a stronger adhesive than that of the tacky insert portion such that, as the tacky surface of the roller is rolled over the tacky surface of the insert portion, any dirt and debris on the tacky insert portion will be drawn off of the tacky insert portion and will adhere to the roller. In this manner, a roller with a tacky surface could be utilized to clean the tacky insert portion.

Again, however, the present invention is not limited to any particular methodology or cleaning agent for cleaning insert portion 300 and any cleaning methodology or agent compatible with the composition of insert portion 300 is contemplated.

Floor mat 100 may also include additional features for assisting in the cleaning of the soles of a person standing on floor mat 100. For example, base portion 200 and/or insert portion 300 may include an antibacterial composition and an antifungal composition. Antibacterial compositions such as anthraquinone derivatives of polyethylene glycol mono- and di-methacrylate could be utilized. Thus, floor mat 100 would be bacteriacidal. The antibacterial feature would be particularly desirable because the floor mat would be able to both clean structural debris from the soles of the person's shoes and remove any potentially harmful bacteria from the person's soles as well.

Additionally, in order to further provide for a desirable sole surface prior to entering a particular area, floor mat 100 could also be provided with a fragrance. Flavones such as tricyclic molecules with aromatic substitution or organic ethers, e.g., liminolic acid, could be utilized. The fragrance is transferred from floor mat 100 to the soles of the person's shoes such that any undesirable odors are favorably masked by the fragrance.

The present invention is not only limited to utilizing an antibacterial composition, an antifungal composition, and/or a fragrance in floor mat 100. Rather, floor mat 100 could also incorporate a variety of other substances that would assist in cleaning the soles of a person's shoes.

Any variety of structures or methods could be utilized for associating an antibacterial composition, an antifungal composition, a fragrance, or any other composition, with floor mat 100. The substances could be applied, as releasable, or dissipatable, coatings to floor mat 100 or could be releasably embedded as, for example, pellets within the structure of floor mat 100 such that as pressure is applied to floor mat 100 the substances are dispensed to the soles of the person's shoes.

Figure 3:
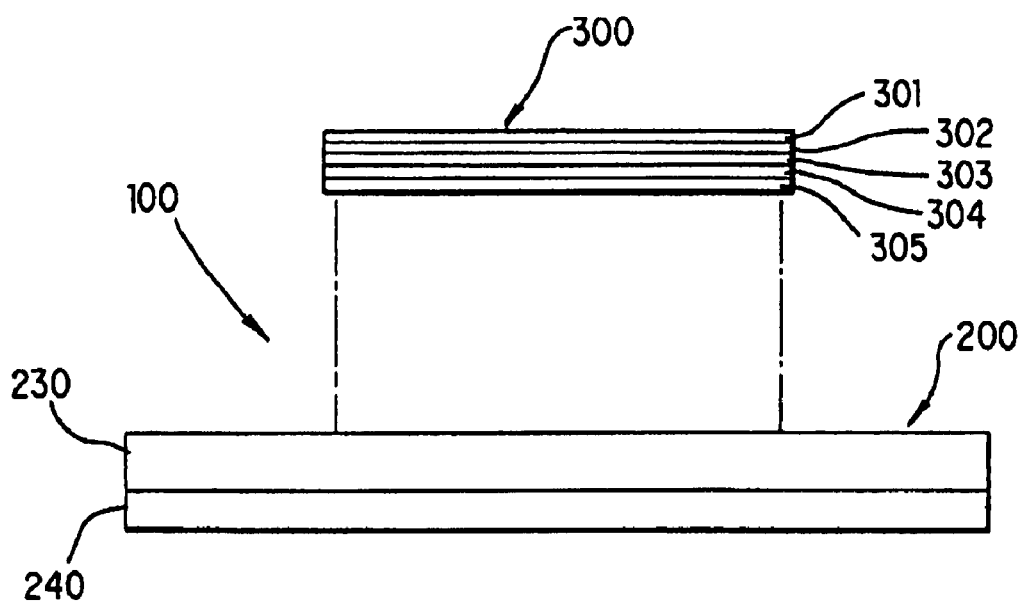
FIG. 3 is an exploded side view of an alternative embodiment of the floor mat of the present invention.

FIG. 3 illustrates an alternative embodiment for floor mat 100. In FIG. 3, it is illustrated that base portion 200 may include separate layers for a water dissipation component 230 and a cushioning component 240. Water dissipation component 230, in this embodiment, is disposed on a top side of the cushioning component 240. However, the present invention is not limited to this particular embodiment for water dissipation component 230 and cushioning component 240. For example, a single hybrid structure could be utilized for base portion 200 that would include the material properties to provide for both water dissipation and conforming structure.

Figure 4:
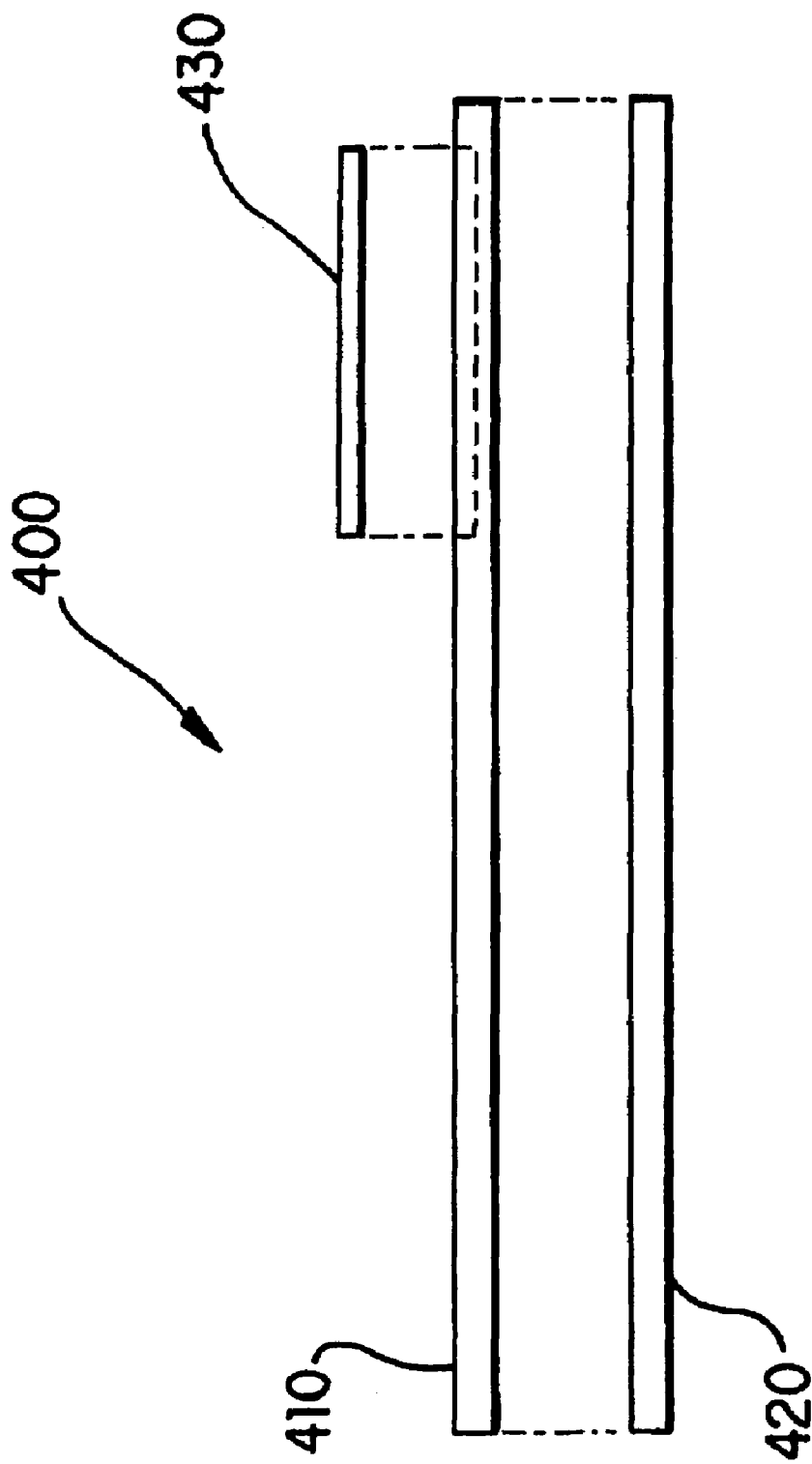
FIG. 4 is an exploded side view of an alternative embodiment of the floor mat of the present invention.

Alternatively, FIG. 4 illustrates that the floor mat may include both a water dissipation component, or wicking layer, and a water absorption layer. In FIG. 4, floor mat 400 includes wicking layer 410 and water absorption layer 420. The wicking layer 410 could be comprised of polypropylene or olefins, or any other suitable material that has the properties of moving the water from the surface of floor mat 400. The water absorption layer 420 is disposed underneath the wicking layer 410 and absorbs any water that passes through the wicking layer 410. The water absorption layer 420 could be periodically removed and dried, such as by example only, in a drying machine.

Of course, a wicking layer 410 may be used either with or without a water absorption layer 420 and a cushioning layer, as described previously in other embodiments, and the water absorption layer 420 could be used with or without a wicking layer 410 and a cushioning layer. Additionally, both the wicking layer and/or the absorption layer and/or the cushioning layer could be used with or without a tacky portion.

Returning to FIG. 3, FIG. 3 also illustrates an alternative embodiment for insert portion 300. Whereas the previously disclosed embodiment for insert portion 300 was discussed as a single structural member that could include a tacky surface on a top side thereof, the embodiment of FIG. 3 for insert portion 300 is comprised of a plurality of layers. As can be seen, layers 301-305, comprise insert portion 300. Each of the layers may include a tacky surface on a top side thereof, as was described previously for insert portion 300. In use, a top-most layer, e.g., layer 301, may be removed from its adjacent lower layer, e.g., layer 302, and may be independently cleaned. After cleaning, the layer may be reinstalled within recess 210 on top of the exposed layer of insert portion 300. In this manner, insert portion 300 may be cleaned by removing a top-most layer, cleaning that layer, and reinstalling that layer within recess 210. Whereas each layer is described as being independently cleanable, it is not required that each individual layer be cleanable. Each layer may be formed of materials as described previously when discussing the embodiment of FIGS. 1 and 2 for the insert portion.

Other alternative embodiments for insert portion 300 are contemplated. For example, whereas the previously disclosed embodiments discussed insert portion 300 as being comprised of one or more layers with a tacky surface on a top side of the layer(s), it is not required that insert portion 300 be formed with only a tacky surface on a top side thereof. More specifically, an alternative embodiment for insert portion 300 could include forming insert portion 300 as a single structural member from a material which is tacky in composition throughout the entire cross-section of the material. A material such as a blend of a noncross-linked hydrophilic thermoplastic, preferably a polyethylene glycol diacrylate with n not exceeding 15, and a hydrophobic material, such as a polyvinyl neoprene chloride, could be utilized for the insert portion of this embodiment. By forming insert portion 300 from a uniform, tacky material, the insert portion 300 does not necessarily have to be removed from recess 210 of base portion 200 to be cleaned. Insert portion 300 could be cleaned in this alternative embodiment by eroding the top surface of the insert portion as a result of use of the insert portion. Thus, by providing an erodible insert portion, the insert portion may be cleaned by the erosion of its top surface as the insert portion is used within floor mat 100.

As insert portion 300 erodes, the exposed surface of insert portion 300 continues to be tacky in composition because of its uniform cross-section. As the exposed tacky surface erodes, the dirt captured by the exposed tacky surface will dissipate as a result of the erosion and thus, the erosion of the insert portion itself provides for a cleanable insert portion.

Alternatively, even with a uniform cross-section of a tacky substance for insert portion 300, the user may remove insert portion 300 from recess 210 and separately clean insert portion 300. Thus, the user is not required to rely solely on the erodible characteristic of insert portion 300 for cleaning of insert portion 300; rather, the user may utilize the erodible cleaning feature of the insert portion in combination with a separate cleaning step of removing the insert portion from the base portion and independently cleaning the insert portion.

As discussed above, insert portion 300 may be comprised of a variety of materials, including materials such as tacky plastics, paper, or adhesives that can be cleanable and may or may not be erodible and reusable.

Figure 5:
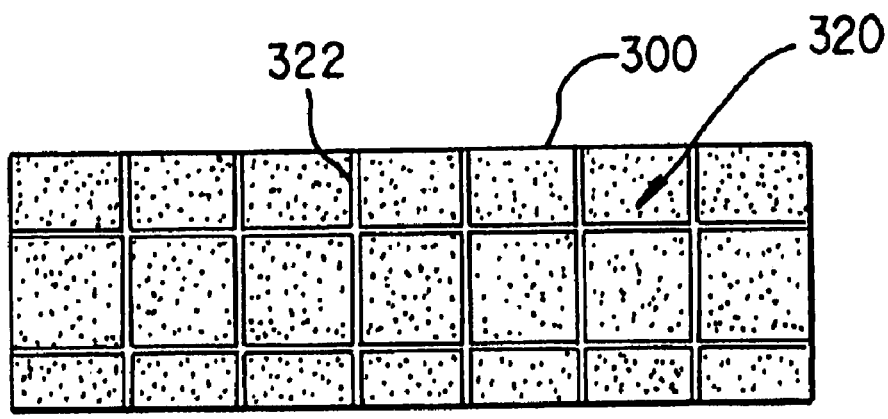
FIG. 5 illustrates a third alternative embodiment for a tacky insert portion of the floor mat of the present invention.

As discussed earlier, it is desirable, but not required, that the floor mat contain a water dissipation and/or absorption capability. This capability is desired to help prevent the tacky surface of the insert portion from becoming wet and, thus, slippery. Whereas it has been discussed that, in order to help prevent a user from slipping on the tacky surface of the insert portion, a water dissipation and/or absorbing capability could be included in the floor mat to reduce the degree of moisture on the tacky surface, this is not the only structure contemplated for preventing the tacky insert portion from becoming slippery. Alternatively, the tacky insert portion itself could be formed to help prevent slipping. FIGS. 5-8 illustrate alternative embodiments for tacky insert portion 300. FIG. 5 illustrates tacky insert portion 300 as including a grid pattern 320 of channels 322 that could be comprised of a non-tacky material. The channels could be either raised from the surface of insert portion 300 or could lie co-planar with the top surface of the insert portion. By forming the channels of a non-tacky material, even if the tacky material of insert portion 300 became wet, a user would be assisted in not slipping on the slippery, wet tacky surface of the insert portion by the presence of the non-tacky surfaces which do not become slippery when wet.

Figure 6:
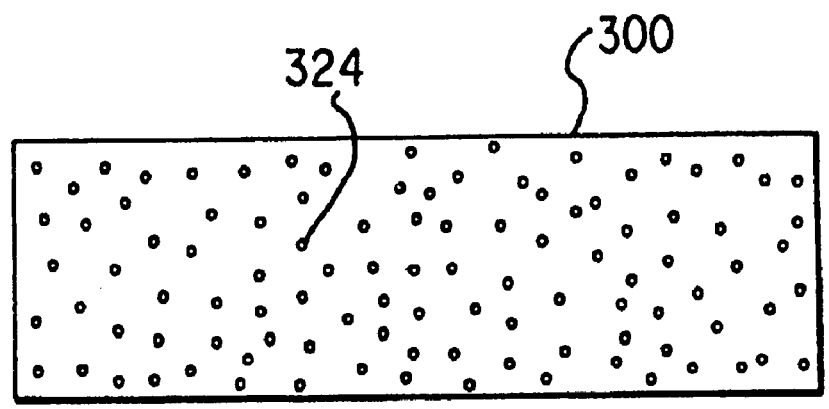
FIG. 6 illustrates a fourth alternative embodiment for a tacky insert portion of the floor mat of the present invention.
Figure 7:
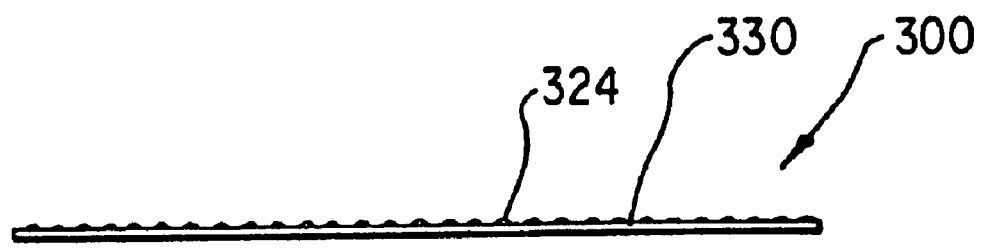
FIG. 7 is a side view of the embodiment for the tacky insert portion of FIG. 6.

FIGS. 6 and 7 illustrate another alternative embodiment for tacky insert portion 300 which includes anti-slip particles 324, e.g., silicon or sand particles, which extend above the top surface 330 of the tacky insert portion. It is desirable that the anti-slip particles be comprised of a material that does not become slippery when wet and that they be exposed from the tacky surface, however, it is not required. Even if the anti-slip particles are embedded within the tacky surface, their extension above the top surface 330 of the tacky insert portion will provide a physical frictional restraint against slipping for the soles of a person's shoes who is standing on the floor mat.

Whereas FIG. 5 illustrates tacky insert portion 300 as including a grid pattern 320 of channels 322 that could be comprised of a non-tacky material and FIGS. 6 and 7 illustrate another alternative embodiment for tacky insert portion 300 which includes anti-slip particles 324 which extend above the top surface 330 of the tacky insert portion, it is not required that these two alternative embodiments contain features that are mutually exclusive. For example, it is contemplated that tacky insert portion 300 could include both a grid pattern of non-tacky channels and anti-slip particles, which is not illustrated specifically in the Figures but which can be easily understood.

Figure 8:
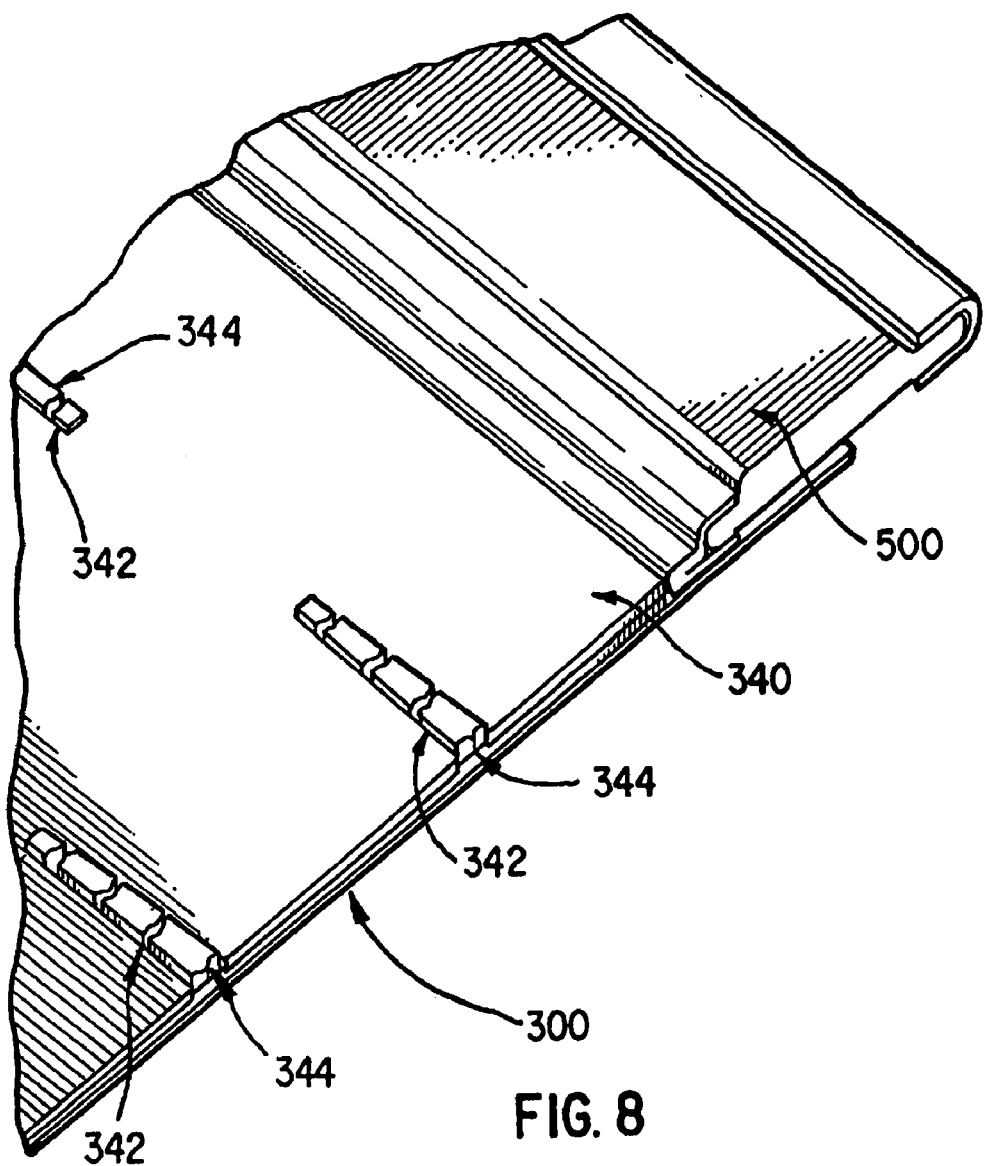
FIG. 8 is a perspective view of a fifth embodiment for a tacky insert portion of the floor mat of the present invention.

Another alternative for providing a slip-resistant tacky portion is to include a plurality of anti-slip members, or treads or nipples, that extend up through and slightly above the surface of the tacky portion. As can be seen in FIG. 8, in this embodiment, tacky portion 300 is inserted within a base portion, which may be a water absorbent border 500, and includes a plurality of apertures 342 within it. Each of a plurality of treads 344, which may extend upward from a base disposed underneath tacky portion 300, extend up through one of the plurality of apertures 342. A top-most end of each tread extends above a top-most surface 340 of tacky portion 300. As a person steps onto tacky portion 300, the quantity and positioning of the treads 344 is such that the tacky portion is able to remove debris from the person's shoes and the treads 344, at least one of which is stepped upon by the person, prevents slipping of the person on the tacky portion 300 should the tacky portion 300 become slippery when wet. The treads 344 may compress when stepped upon such that the top-most end of the tread is co planar with the top-most surface 340 of the tacky portion 300. In this manner, the tread will contact the person's shoes to prevent slipping but yet not hinder contact between the person's shoes and the tacky surface of the mat, which enhances the cleaning of the person's shoes. Therefore, there is a relationship between the distance that the tread extends above the top-most surface of the tacky portion and the compressibility of the tread; a relationship which provides the functionality discussed above.

The treads may be configured in any shape and size. Additionally, the treads may be comprised of any material which is slip-resistant when wet, such as, for example, rubber or plastics. The treads may include grooves within them to further assist in preventing a person from slipping on the tacky portion.

In another alternative embodiment for a tacky portion, the tacky portion could also include a water dissipating capability. The tacky portion could be comprised of a hydrophobic porous structure which would assist in dissipating water from the surface of the tacky portion.

It is also contemplated that a water absorbing powder, such as a talcum powder, could be provided in the present invention. The powder could either be integrated into the floor mat or be separately associated with the floor mat. The talcum powder would remove moisture from the soles of a person's shoes when the person stepped into the powder and the tacky insert portion could then remove the powder from the person's soles, in addition to any dirt on the soles, when the person next steps on the tacky insert portion.

Whereas cleanable portion 300 has been discussed as an insert portion, it is not required that cleanable portion 300 be inserted into floor mat 100. There exists many alternative possibilities for associating cleanable portion 300 with floor mat 100. For example, cleanable portion 300 could be placed on top of base portion 200 or could be positioned adjacent to base portion 200. The present invention is not limited to inserting any of the embodiments for cleanable portion 300 within base portion 200.

Figure 9:
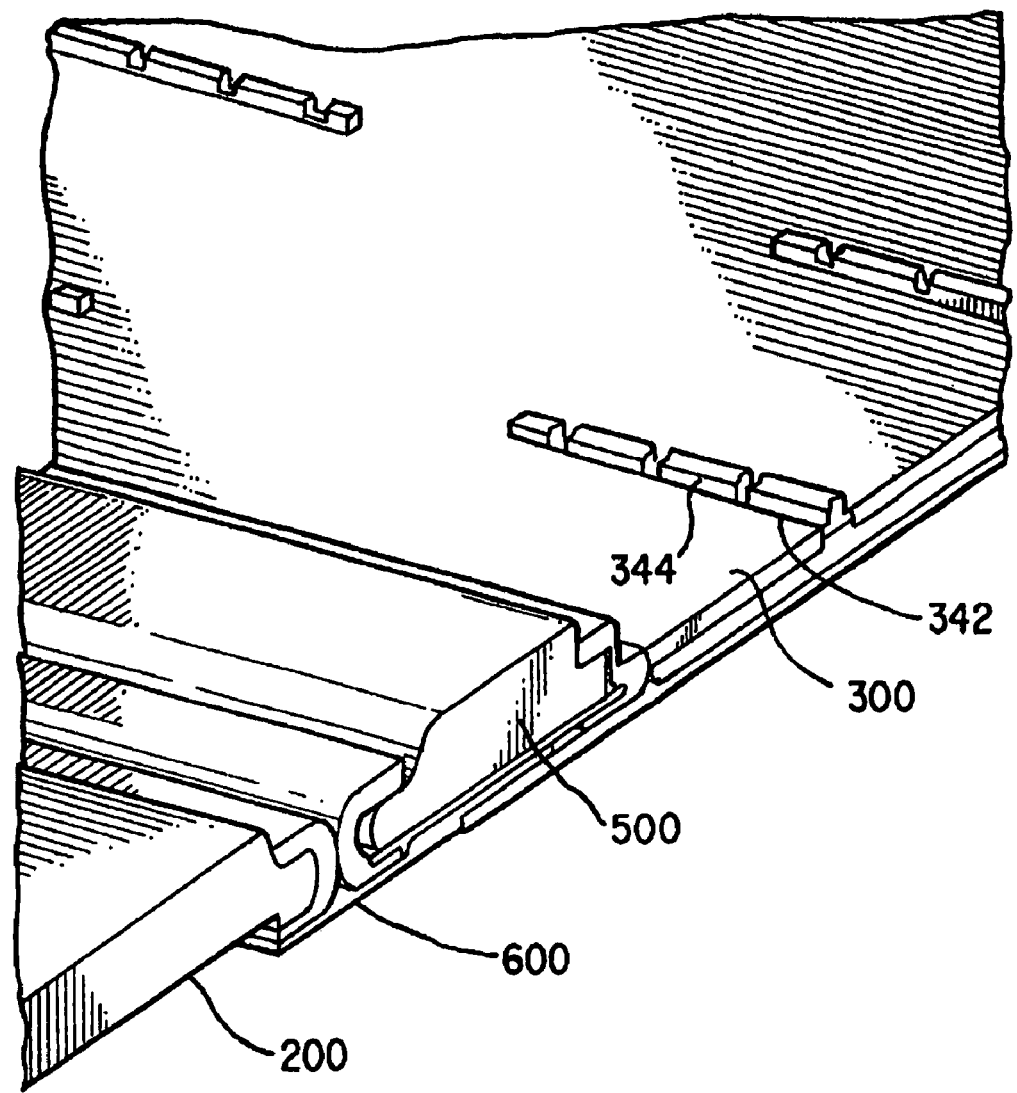
FIG. 9 is an embodiment for a floor mat where the tacky portion and the non-tacky portion are separable.

For example, FIG. 9 illustrates a tacky portion 300 and a non-tacky portion 200, which may include a water dissipation component, a water absorbing component, and a cushioning component, as discussed previously, that are separable. As can be seen in FIG. 9, tacky portion 300 may be bordered within a border 500, which may be water absorbent, water dissipative, and include a cushioning component, and may include a plurality of apertures 342 and treads 344 within it. Tacky portion 300 can include any of the embodiments previously discussed. An attachment layer 600 is positioned on an underside of both border 500 of tacky portion 300 and non-tacky portion 200. The border 500 and/or non-tacky portion 200 may be releasably attached to attachment layer 600. Thus, through attachment layer 600, border 500, and therefore tacky portion 300, and non-tacky portion 200 are releasably attachable to each other. In this manner, it is possible to, for example, position non-tacky portion 200 outside of a person's home on the front porch and tacky portion 300 within the person's home.

Attachment layer 600 can be any of a variety of materials. All that is required is that the attachment layer be able to releasable join one portion of the floor mat to a second portion of the floor mat. For example, a hook and loop fastener assembly, e.g., Velcro™, can be used with one portion of the assembly on the attachment layer and the other portion on the underside of the first portion of the floor mat and the second portion of the floor mat. Alternatively, an adhesive can be utilized to releasably join the two portions of the floor mat to the attachment layer. Additionally, snaps, including any type of male/female connector, may be used to join the two portions to the attachment layer.

Figure 10:
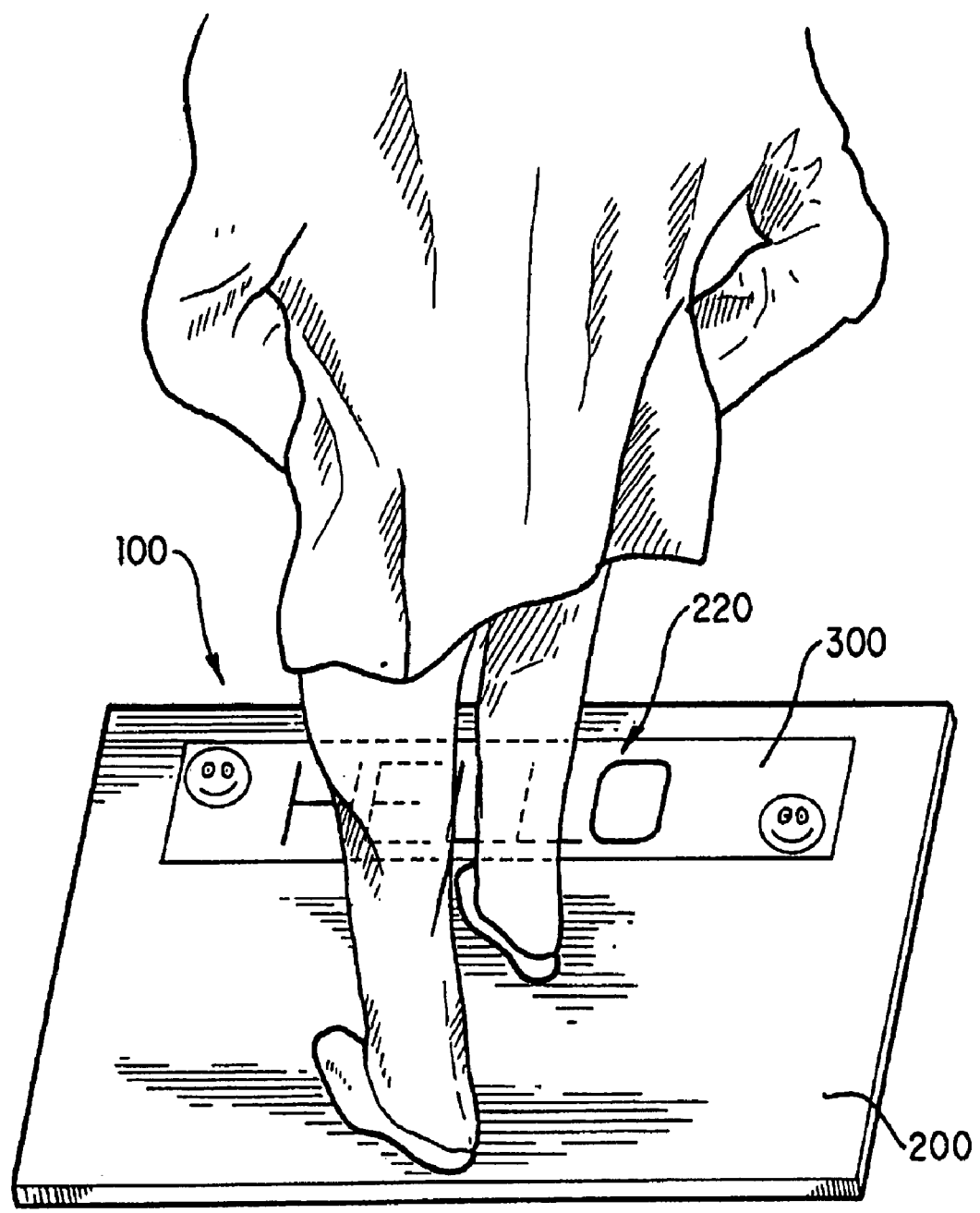
FIG. 10 is a perspective view of an embodiment of the floor mat of the present invention as being used in one step of a process for utilizing the floor mat.

FIG. 10 illustrates a first process step in utilizing an embodiment of the floor mat 100 of the present invention. As was described previously, an embodiment of floor mat 100 includes a base portion 200 and an insert portion 300. As can be seen in FIG. 10, and as was also discussed previously, a different graphic display 220 is present in the embodiment of FIG. 10 than was illustrated in the embodiment of FIGS. 1 and 2. Thus, FIG. 10 displays a "Hello" message with "smiley face" representations in the graphic 220.

As can be seen in FIG. 10, in utilizing an embodiment of the present invention, a user would first step upon base portion 200. As discussed earlier, base portion 200 may include a water dissipating and/or absorbing component and is thus able to assist in removing any moisture from the soles of the person's shoes. As was also discussed earlier, because base portion 200, in one embodiment, also includes a cushioning component, base portion 200 conforms to the person's soles when the person steps upon base portion 200. Whereas not illustrated in FIG. 10, as discussed previously, an antibacterial composition, an antifungal composition, a fragrance, or any other cleaning substance may also be associated with floor mat 100 and applied to the soles of the person's shoes when the person applies pressure to floor mat 100.

Figure 11:
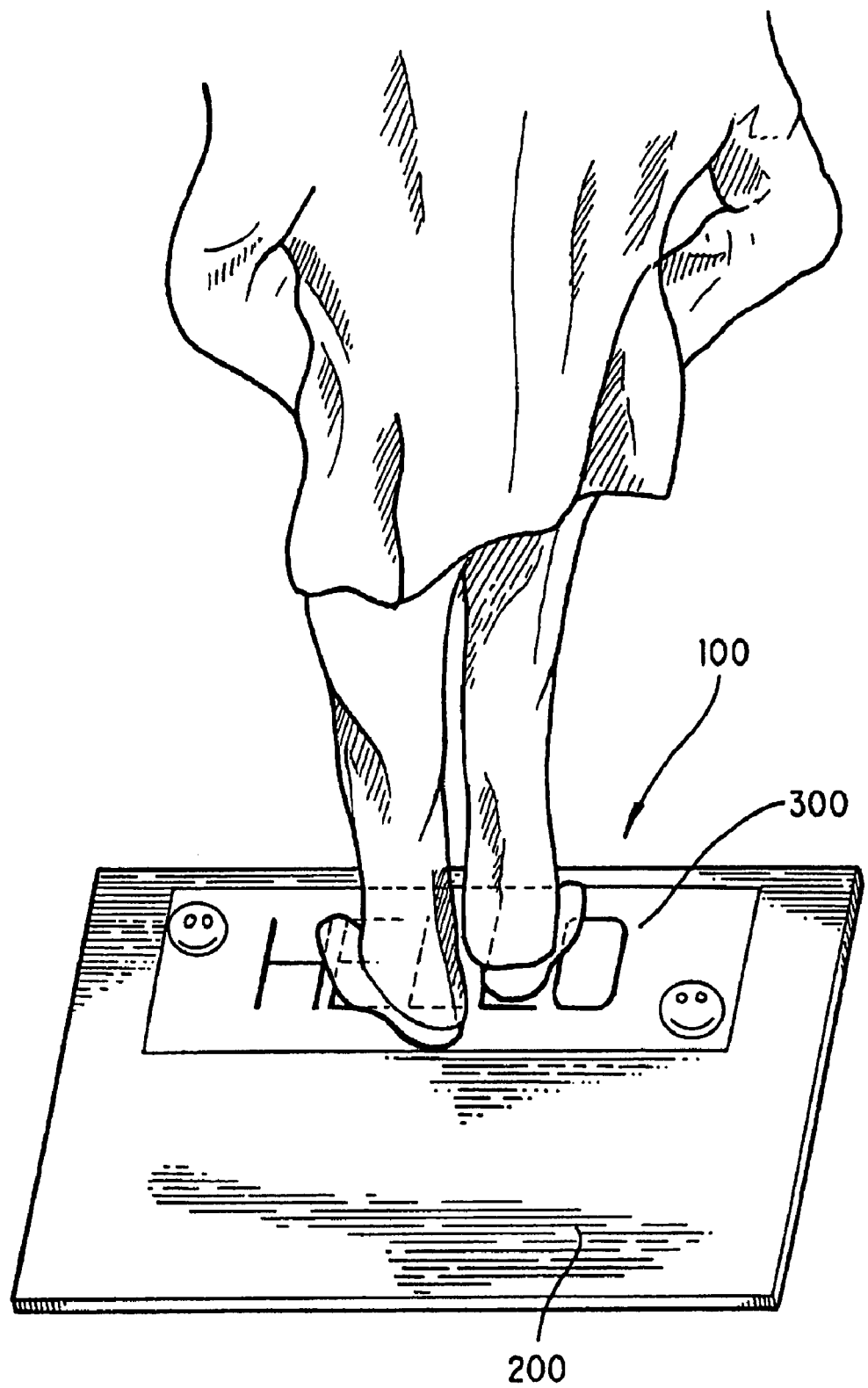
FIG. 11 is a perspective view of the floor mat of FIG. 10 as being used in a second step of a process for utilizing the floor mat.

As can be seen in FIG. 11, the second process step in utilizing the present invention includes the person stepping onto insert portion 300 of floor mat 100. As discussed previously, insert portion 300 may include a tacky surface on a top side thereof for assisting in removing debris from the soles of the person's shoes. Additionally, antibacterial compositions, antifungal compositions, fragrances, or other cleaning compositions may also be included within insert portion 300 for dispensing to the soles of the person's shoes.

After the person steps onto insert portion 300, the user then steps off of floor mat 100. As described previously, floor mat 100 may be cleaned after an accumulation of dirt on insert portion 300 by any of the methods described previously. Insert portion 300 may be removed from base portion 200 and cleaned, a layer may be removed from insert portion 300 to be cleaned or discarded, or insert portion 300 may be cleaned through erosion of insert portion 300. The present invention is not limited to any particular methodology for cleaning insert portion 300 of floor mat 100.

The disclosed embodiments are illustrative of the various ways in which the present invention may be practiced. Other embodiments can be implemented by those skilled in the art without departing from the spirit and scope of the present invention.

What is claimed is:

1. A floor mat having an electronic display device associated therewith, wherein the electronic display device is adapted to be connected to a network through a computer.

2. The floor mat of claim 1, wherein the electronic display device is adapted to be wired to the computer.

3. The floor mat of claim 2, wherein the computer is adapted to be wired to the network.

4. The floor mat of claim 2, wherein the computer is adapted to be wirelessly connected to the network.

5. The floor mat of claim 1, wherein the electronic display device is adapted to be wirelessly connected to the computer.

6. The floor mat of claim 5, wherein the computer is adapted to be wired to the network.

7. The floor mat of claim 5, wherein the computer is adapted to be wirelessly connected to the network.

8. The floor mat of claim 1, wherein text on the electronic display device is changed by an editor through a web page on the network.

9. A system comprising at least two floor mats each comprising an electronic display device, wherein at least one of the electronic display devices is adapted to be connected to a network.

10. The system of claim 9, wherein text on at least one of the electronic display devices is changed by an editor through a web page on the network.

11. The system of claim 9, wherein text on a plurality of the electronic display devices is changed by an editor through a web page on the network.

12. The system of claim 9, wherein text on all electronic display devices is changed by an editor through a web page on the network.

13. A system comprising at least two electronic display devices wherein at least one of the electronic display devices is associated with a floor mat, wherein at least two of the electronic display devices are adapted to be connected to each other.

14. The system of claim 13, wherein the at least two of the electronic display devices are adapted to be connected to each other through a network.

15. The system of claim 14, wherein text on at least one of the electronic display devices is changed by an editor through a web page on the network.

16. A floor mat having an electronic display device associated therewith, wherein the electronic display device is adapted to be connected to a network and is in electronic communication with another electronic display device adapted to be connected to the network.

17. The floor mat of claim 16, wherein the floor mat is adapted to be wired to the network.

18. The floor mat of claim 16, wherein the floor mat is adapted to be wirelessly connected to the network.

19. The floor mat of claim 16 wherein text on the electronic display device is changed by an editor through a web page on the network.

20. The floor mat of claim 16 wherein text on the electronic display device of the floor mat and text on another electronic display device are changed by an editor through a web page on the network.

* * * * *